US006943473B2

(12) United States Patent
Furuse et al.

(10) Patent No.: US 6,943,473 B2
(45) Date of Patent: Sep. 13, 2005

(54) ELECTRIC ROTATING MACHINE

(75) Inventors: Hisayuki Furuse, Kanagawa (JP); Masaki Nakano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/468,284

(22) Filed: Aug. 19, 2003

(65) Prior Publication Data

US 2004/0075358 A1 Apr. 22, 2004

(30) Foreign Application Priority Data

Feb. 12, 2002 (JP) ....................................... 2002-033738

(51) Int. Cl.[7] ................................................ H02K 17/44

(52) U.S. Cl. ....................................... 310/112; 310/114

(58) Field of Search ................................ 310/112, 113, 310/114, 268, 58, 64

(56) References Cited

U.S. PATENT DOCUMENTS 4,605,874 A 8/1986 Whiteley
4,959,578 A * 9/1990 Varga ......................... 310/268
5,245,238 A 9/1993 Lynch et al.
5,289,069 A * 2/1994 Hasegawa et al. ..... 310/156.37
5,334,898 A 8/1994 Skybyk
5,619,087 A * 4/1997 Sakai ......................... 310/268
5,945,766 A * 8/1999 Kim et al. .................. 310/268
5,982,070 A * 11/1999 Caamano .................... 310/216
6,114,784 A 9/2000 Nakano
6,373,160 B1 * 4/2002 Schrodl ...................... 310/114
6,373,162 B1 * 4/2002 Liang et al. ........... 310/156.53
6,445,105 B1 * 9/2002 Kliman et al. .............. 310/268
6,590,312 B1 * 7/2003 Seguchi et al. ............. 310/266
6,617,716 B2 * 9/2003 Ishida ......................... 310/58
6,639,337 B1 10/2003 Nakano
6,710,492 B2 3/2004 Minagawa

FOREIGN PATENT DOCUMENTS

| | | | |
|---|---|---|---|
| EP | 0 945 963 | A2 | 9/1999 |
| GB | 2 360 140 | A | 9/2001 |
| JP | 2000-14086 | A | 1/2000 |
| JP | 2001-103718 | A | 4/2001 |
| JP | 2001-275320 | A | 10/2001 |
| WO | WO 99/39426 | A1 | 8/1999 |
| WO | WO 00/64035 | A1 | 10/2000 |

* cited by examiner

*Primary Examiner*—Garren Schuberg
*Assistant Examiner*—Nguyen Hanh
(74) *Attorney, Agent, or Firm*—Foley & Lardner LLP

(57) ABSTRACT

An electric rotating machine including a casing, two disk-shaped rotors arranged in concentric relation to each other within the casing, and a stator disposed concentrically with the rotors within the casing. The rotors include magnets, respectively. The magnet of one of the rotors and the magnet of the other of the rotors are disposed radially offset from each other. The stator includes a radially outer portion axially opposed to the magnet of one of the rotors and a radially inner portion axially opposed to the magnet of the other of the rotors.

20 Claims, 5 Drawing Sheets

ELECTRIC ROTATING MACHINE

BACKGROUND OF THE INVENTION

The present invention relates to an electric rotating machine including a casing, two rotors and a stator common to the rotors which are disposed within the casing.

U.S. Pat. No. 6,114,784, corresponding to Japanese Patent Application First Publication No. 2000-14086, discloses a multi-layer motor including a cylindrical stator and two cylindrical rotors which are disposed inside and outside the stator. The stator and the inner and outer rotors form a three-layered structure. The stator is supplied with compound current for separately driving the inner and outer rotors. The inner and outer rotors are independently operated by controlling the compound current, thereby enabling separate rotation outputs from the inner and outer rotors, respectively.

SUMMARY OF THE INVENTION

However, since the stator of the motor of the related art is disposed between the rotors in radially opposed manner, a cooling construction for the stator becomes complicated, in which there are provided a plurality of cooling passages extending along opposed axial ends and a circumferential periphery of the stator. This will lead to poor cooling efficiency of the stator and increase in production cost of the motor.

An object of the present invention is to solve the above-described problem and to provide a motor including a stator supported by a casing in such a manner that a radially outer portion of the stator and a radially inner portion thereof are axially opposed to two rotors, respectively.

In one aspect of the present invention, there is provided an electric rotating machine, comprising:

a casing;

two disk-shaped rotors arranged in concentric relation to each other within the casing, the rotors including magnets, respectively, the magnet of one of the rotors and the magnet of the other of the rotors being disposed radially offset from each other; and a stator disposed concentrically with the rotors within the casing, the stator comprising a radially outer portion axially opposed to the magnet of one of the rotors and a radially inner portion axially opposed to the magnet of the other of the rotors.

In a further aspect of the present invention, there is provided an electric rotating machine, comprising:

a first rotor including a first magnet;

a second rotor disposed concentrically with the first rotor, the second rotor including a second magnet radially offset from the first magnet; and a stator disposed concentrically with the first and second rotors, the stator including first means magnetically operative to associate with the first magnet upon being energized and second means magnetically operative to associate with the second magnet upon being energized.

DETAILED DESCRIPTION OF THE PREFERED EMBODIMENT

Figure 1:
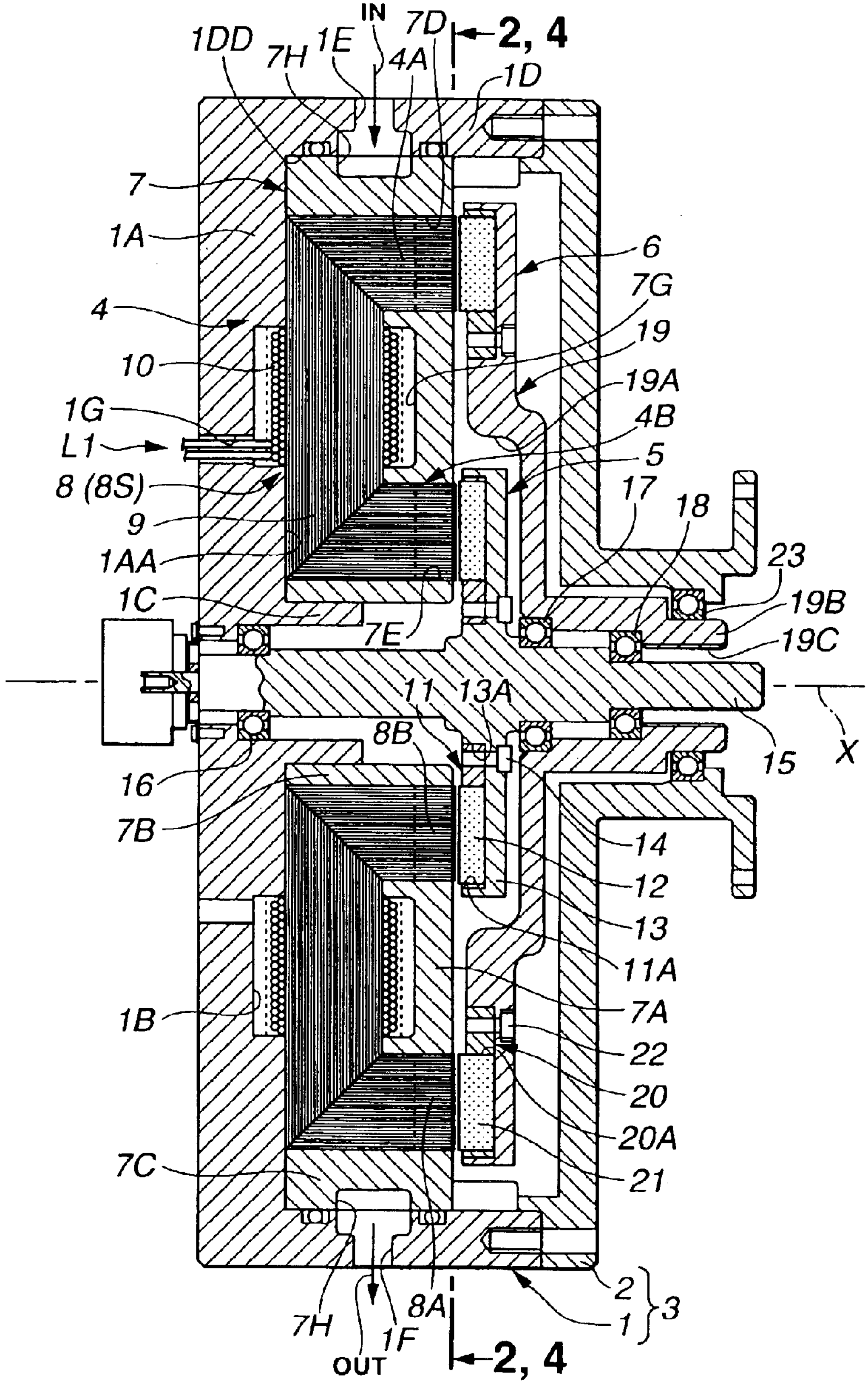
FIG. 1 is a vertical cross-section of an electric rotating machine according to the present invention.
Figure 2:
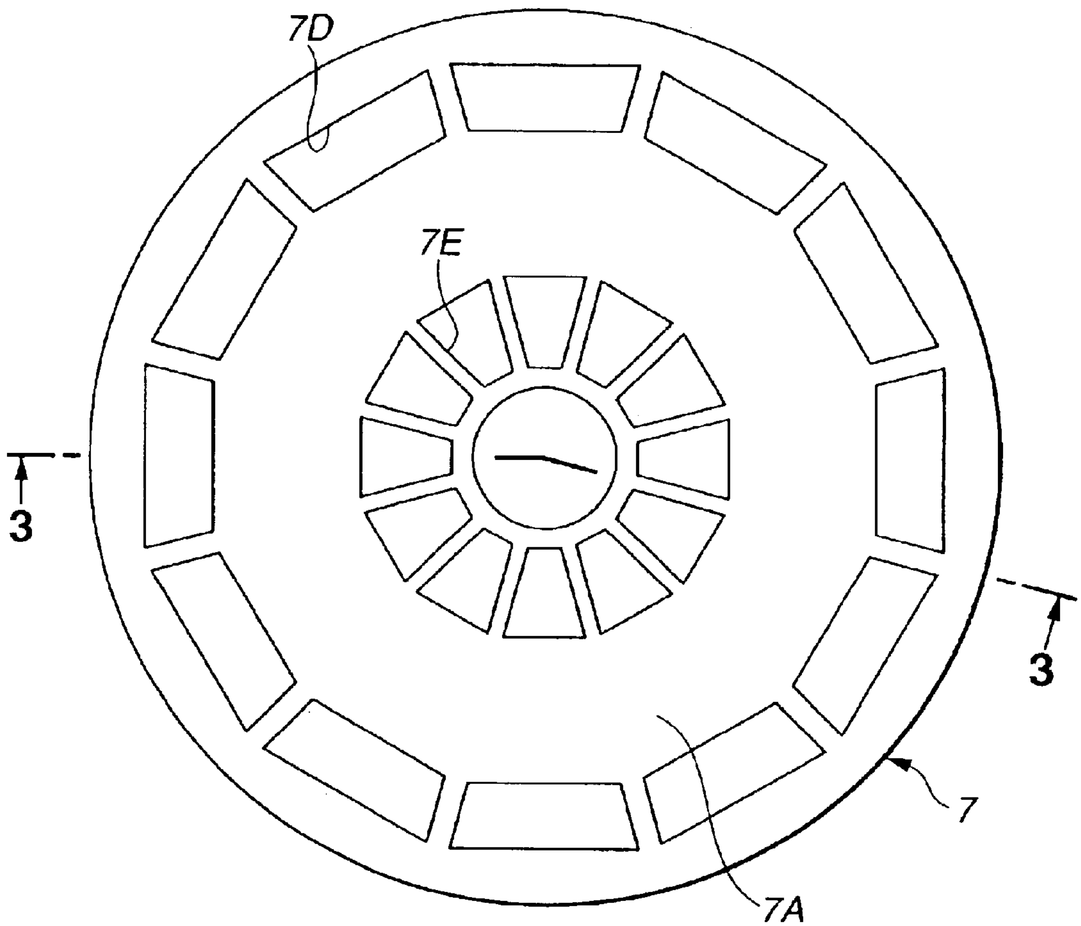
FIG. 2 is a cross-sectional view taken along line 2—2 of FIG. 1, showing a stator bracket of a stator used in the electric rotating machine of the first embodiment.

Referring now to FIGS. 1 to 4, a first embodiment of an electric rotating machine of the present invention is explained. As illustrated in FIG. 1, the electric rotating machine includes casing 3 constituted of casing body 1 and end cover 2. Stator 4, first rotor 5 and second rotor 6 are disposed within casing 3. Rotors 5 and 6 have common axis X about which rotors 5 and 6 are rotatable. Rotors 5 and 6 have generally disk shapes and diameters different from each other. Rotors 5 and 6 include magnets 12 and 21, respectively. Magnet 12 of rotor 5 and magnet 21 of rotor 6 are radially offset from each other. Stator 4 is arranged concentrically with rotors 5 and 6 and axially opposed thereto. Stator 4 includes radially outer portion 4A axially opposed to magnet 21 of rotor 6 and radially inner portion 4B axially opposed to magnet 12 of rotor 5. Radially outer portion 4A and radially inner portion 4B are magnetically operative to associate with magnet 21 of rotor 6 and magnet 12 of rotor 5, respectively, when stator 4 is energized.

Figure 3:
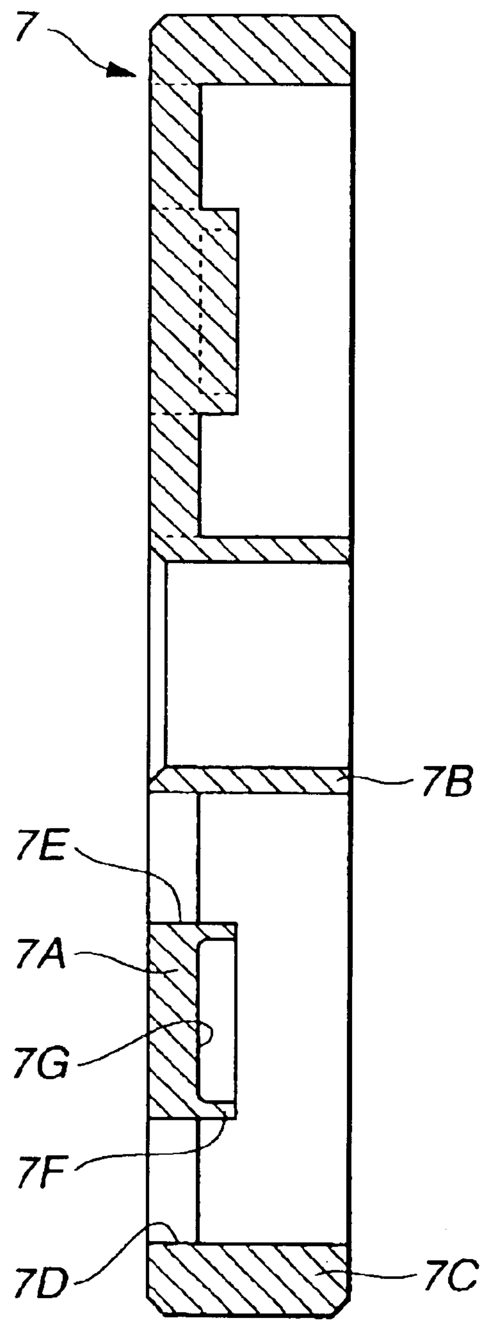
FIG. 3 is a cross-sectional view of the stator bracket, taken along line 3—3 of FIG. 2.
Figure 4:
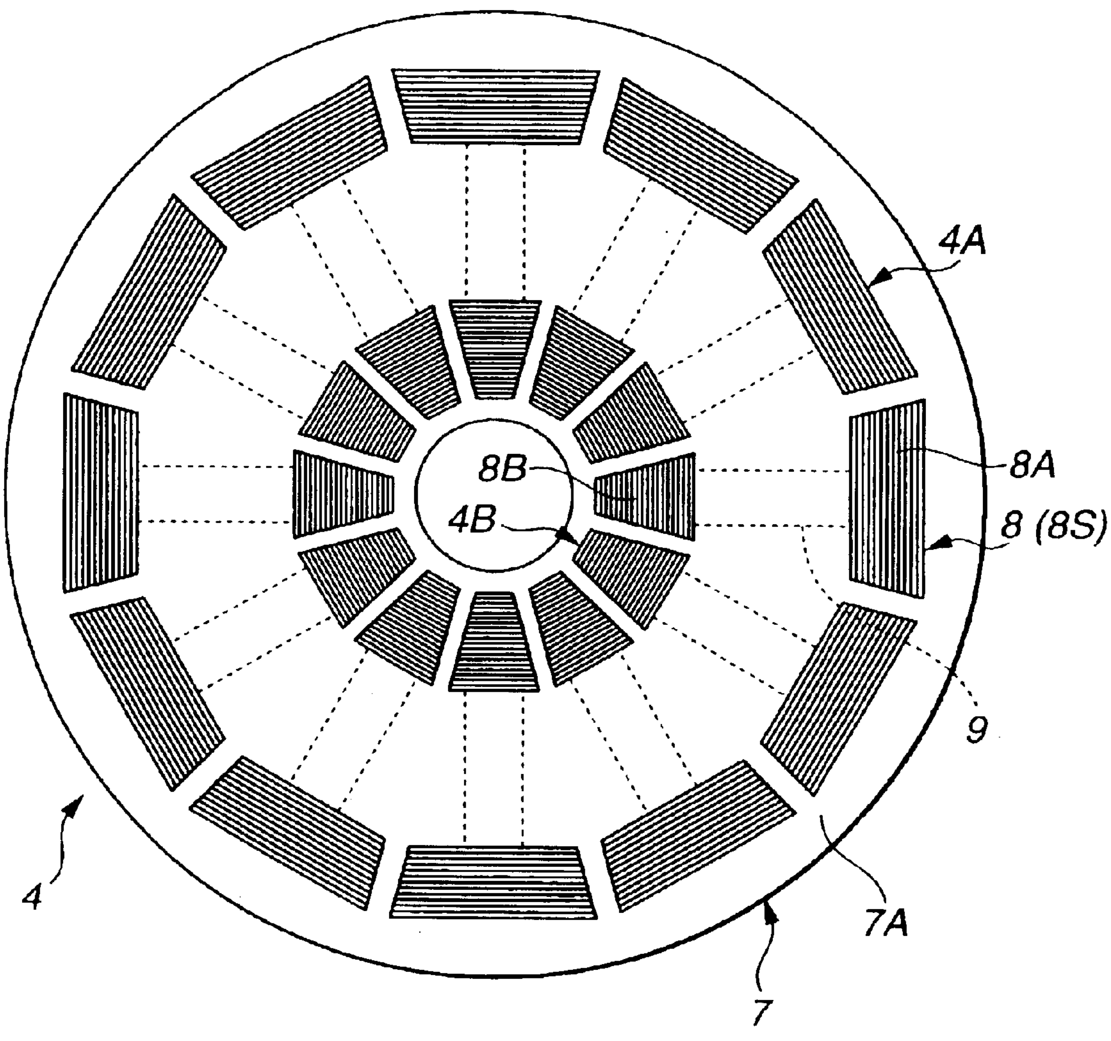
FIG. 4 is a cross-sectional view taken along line 4—4 of FIG. 1, showing the stator.

Specifically, stator 4 includes stator bracket 7 and stator body 8 mounted to stator bracket 7. Stator body 8 includes a plurality of stator elements 8S, twelve stator elements in this embodiment, arranged in circumferentially spaced relation as shown in FIG. 4. Stator bracket 7 has a generally annular shape having a double-walled structure. Stator bracket 7 includes radially extending base wall 7A with a central bore, inner circumferential wall 7B axially extending along an inner periphery surrounding the central bore, and outer circumferential wall 7C axially extending along an outer periphery of base wall 7A. As seen from FIGS. 2 and 3, base wall 7A has a disk-shape with the central bore. Outer openings 7D and inner openings 7E are formed in an outer circumferential portion of base wall 7A and an inner circumferential portion thereof, respectively. Outer and inner openings 7D and 7E have trapezoidal shapes, respectively. The respective numbers of trapezoidal openings 7D and 7E correspond to the number of the stator elements 8S. Outer openings 7D and inner openings 7E are circumferentially equidistantly arranged in radial alignment. As illustrated in FIG. 3, base wall 7A includes projection 7F axially extending between inner and outer circumferential walls 7B and 7C. Groove 7G as a coil chamber is formed in projection 7F, in which winding 10 wound about each of stator elements 8S is disposed as shown in FIG. 1.

As illustrated in FIG. 1, each of stator elements 8S is in the form of laminated plates made of ferromagnetic material, for example, steel. Stator element 8S has a generally C-shape or an open-ended rectangular shape in section as shown in FIG. 1. Stator element 8S includes bending end portions 8A and 8B which are spaced from each other and extend in one direction, namely, to the right in FIG. 1. Core portion 9 is disposed between bending end portions 8A and 8B and carries winding 10 wound thereon. Bending end portions 8A and 8B are formed by bending longitudinal end portions of the laminated plates in the same direction. Bending end portions 8A and 8B form an outer magnetic pole portion and an inner magnetic pole portion upon stator element 8S being energized through winding 10.

As illustrated in FIG. 4, each of the laminated plates of stator element 8S has a generally I-shape and a length extending in the longitudinal direction and a width extending perpendicular to the longitudinal direction. The width of outer bending end portion 8A is larger than that of inner bending end portion 8B and that of core portion 9. The lengths of bending end portions 8A and 8B extend along axis X of FIG. 1 toward rotors 6 and 5, respectively.

Dimensions of the laminated plates forming bending end portions 8A and 8B and core portion 9 of stator element 8S are designed as follows. As illustrated in FIG. 1, the lengths of the laminated plates, namely, the total lengths of bending end portions 8A and 8B and core portion 9, become gradually large in an axial direction extending from the end cover side toward the casing body side. As illustrated in FIG. 4, the widths of respective bending end portions 8A and 8B gradually increase radially outwardly. In other words, bending end portions 8A and 8B having trapezoidal-shaped cross sections as shown in FIG. 4, have the widths gradually decreasing radially inwardly, respectively. As illustrated in FIG. 1, bending end portions 8A and 8B of the ferromagnetic plates are laminated in the radial direction of stator 4, while core portion 9 of the ferromagnetic plates are laminated in the axial direction of stator 4.

Upon assembling stator 4, stator body 8 is assembled to stator bracket 7. Stator element 8S with winding 10 is fitted into stator bracket 7 in such a manner as to insert outer bending end portion 8A into outer opening 7D and insert inner bending end portion 8B into inner opening 7E from the left side in FIG. 1. Thus, stator 4 is formed as a stator assembly.

As illustrated in FIG. 1, casing body 1 of casing 3 includes end wall 1A with a central bore, and circumferential wall 1D connected with an outer periphery of end wall 1A. Groove 1B as a coil chamber is formed in end wall 1A on one end face thereof, in which winding 10 wound about stator element 8S of stator 4 is disposed. Lead L1 of winding 10 extends in through-hole 1G formed in end wall 1A. Casing body 1 also includes fitting projection 1C onto which stator bracket 7 is fitted. Fitting projection 1C extends from the one end face of end wall 1A toward the inside of casing 3 in the direction-of axis X and along an inner periphery surrounding the central bore. Upon mounting stator 4 to casing 3, inner circumferential wall 7B of stator bracket 7 is fitted onto fitting projection 1C. In the fitted state as shown in FIG. 1, stator bracket 7 and casing body 1 are in contact with each other as follows: between an inner surface of inner circumferential wall 7B and an outer surface of fitting projection 1C, between an outer surface of outer circumferential wall 7C and inner surface 1DD of circumferential wall 1D, and between axial end surfaces of inner and outer circumferential walls 7B and 7C and wall surface 1AA of end wall 1A of casing body 1. Stator element 8S is interposed between end wall 1A of casing body 1 and stator bracket 7 and supported thereby in the direction of axis X.

A coolant path supplying coolant for cooling stator 4 is provided. The coolant path includes annular coolant passage 7H circumferentially extending in outer circumferential wall 7C of stator bracket 7, and inlet 1E and outlet 1F which are formed in circumferential wall 1D of casing body 1. Coolant passage 7H is located at substantially an axial-middle portion of outer circumferential wall 7C which is substantially aligned with an axial-middle portion of the outer-most plate of outer bending end portion 8A of stator element 8S. Coolant passage 7H has such a maximum depth as to perform suitable heat exchange with outer and inner bending end portions 8A and 8B without causing deteriorated strength of stator bracket 7. Coolant passage 7H is communicated with inlet 1E and outlet 1F of circumferential wall 1D of casing body 1. Coolant is supplied into coolant passage 7H through inlet 1E and discharged therefrom through outlet 1F as indicated by arrows IN and OUT of FIG. 1.

Disk-shaped first rotor 5 includes annular magnet holder 11 with a plurality of magnets 12, and rotor body 13 to which magnet holder 11 is mounted. Magnets 12 are circumferentially equidistantly arranged and fitted to opening 11A which is formed in magnet holder 11. Magnet holder 11 is fitted to annular recess 13A formed in rotor body 13, and coupled to rotor body 13 by means of bolts 14. Rotor body 13 is integrally formed with first output shaft 15 which is rotatably supported in the central bore of end wall 1A by means of bearing 16. Output shaft 15 also is rotatably supported within boss portion 19B of rotor body 19 of second rotor 6 by means of bearings 17 and 18. Output shaft 15 projects from a central bore of end cover 2 to the outside of casing 3 to thereby derive rotation of output shaft 15. Rotor body 13 is located at substantially an axial-middle portion of output shaft 15. An outer diameter of rotor body 13 is set such that magnet 12 is opposed to an axial end face of inner bending end portion 8B of stator element 8S.

Disk-shaped second rotor 6 includes rotor body 19 and magnet holder 20 mounted to rotor body 19. Rotor body 19 has an outer diameter larger than that of rotor body 13 of rotor 5. Rotor body 19 has recessed portion 19A at a radially inner portion thereof, within which rotor 5 is disposed. A plurality of magnets 21 are circumferentially equidistantly arranged and fitted to opening 20A which is formed in magnet holder 20. The number of N-S pole pairs of rotor 6 is different from that of rotor 5. Magnet holder 20 with magnets 21 is mounted to rotor body 19 and coupled thereto by means of bolts 22. An outer diameter of rotor body 19 is set such that each of magnets 21 is opposed to an axial end face of outer bending end portion 8A of stator element 8S. Boss portion 19B of rotor body 19 is rotatably supported in the central bore of end cover 2 of casing 3 via bearing 23. Boss portion 19B has inner circumferential splined surface 19C adapted to be engaged with a second output shaft, not shown. The second output shaft is introduced from the central bore of end cover 2 into boss portion 19B. With the engagement between splined surface 19C and the second output shaft, rotation of rotor 6 is transmitted to the second output shaft via boss portion 19B.

The electric rotating machine of the invention is operated as follows. When compound current is supplied to winding 10 of stator 4 via leads L1, bending end portions 8A and 8B of stator 4 act as the magnetic pole portions between which a magnetic field is generated. The magnetic field influences to magnets 12 and 21 of rotors 5 and 6, so that rotors 5 and 6 are driven, respectively. By regulating the compound current, rotation outputs of rotors 5 and 6 are independently controlled and transmitted to first output shaft 15 integral with rotor 5 and the second output shaft via boss portion 19B of rotor 6.

With the axially opposed arrangement of stator 4 and rotors 5 and 6, the coolant path constituted of coolant passage 7H and inlet 1E and outlet 1F is formed along the circumferential periphery of stator 4 to thereby allow ready access of coolant to stator 4. This provides a simple cooling construction for stator 4 as compared with the cooling construction used in the multi-layer motor of the above-described related art, and serves for improving cooling efficiency of the cooling construction for stator 4 and reducing a production cost of the electric rotating machine.

Further, with the axially opposed arrangement, a dimension of stator 4 can be designed without being adversely affected by diameters of rotors 5 and 6. Furthermore, bearings 16, 17 and 18 for supporting stator 4 and rotors 5 and 6 can be reduced in radial size.

Further, with the provision of groove 1B as the coil chamber for winding 10 in end wall 1A of casing body 1 of casing 3, an axial length of groove 1B which extends in the direction of axis X can be readily adjusted corresponding to change in size of winding 10. This allows variation in design of winding 10 for obtaining a desired intensity of an electromagnetic field formed by energizing winding 10.

Further, stator 4 is provided in the form of the stator assembly including stator bracket 7 and stator body 8 mounted to stator bracket 7. With this construction of stator 4, stator bracket 7 can radiate heat in stator body 8 so that the heat radiation property of stator 4 can be improved. Furthermore, even if stator body 8 is constituted of a large number of stator elements 8S, stator 4 can be formed as one unit and then be mounted to casing 3. This serves for improving efficiencies in assembling stator 4 and in mounting stator 4 to casing 3. This also serves for enhancing freedom of design of the stator.

Further, stator body 8 is axially supported by stator bracket 7 and end wall 1A of casing body 1 of casing 3, so that stator body 8 can be prevented from axial displacement due to a reaction force being generated therein. Furthermore, since stator bracket 7 is fitted onto fitting projection 1C of casing body 1, axial and radial positioning of stator 4 can be performed. This serves for improving rigidity of the supporting structure for stator 4.

Further, stator element 8S is formed by a plurality of laminated ferromagnetic plates, and each plate has bending end portions 8A and 8B which extend in the same direction and form the magnetic pole portions upon energizing stator element 8S. Owing to the orientation of bending end portions 8A and 8B, rotors 5 and 6 are arranged on the same side in the axial direction.

Furthermore, there can be provided a simple cooling construction. Namely, the coolant path for cooling stator 4 is constituted by coolant passage 7H formed in outer circumferential wall 7C, and inlet 1E and outlet 1F formed in circumferential wall 1D of casing body 1.

Figure 5:
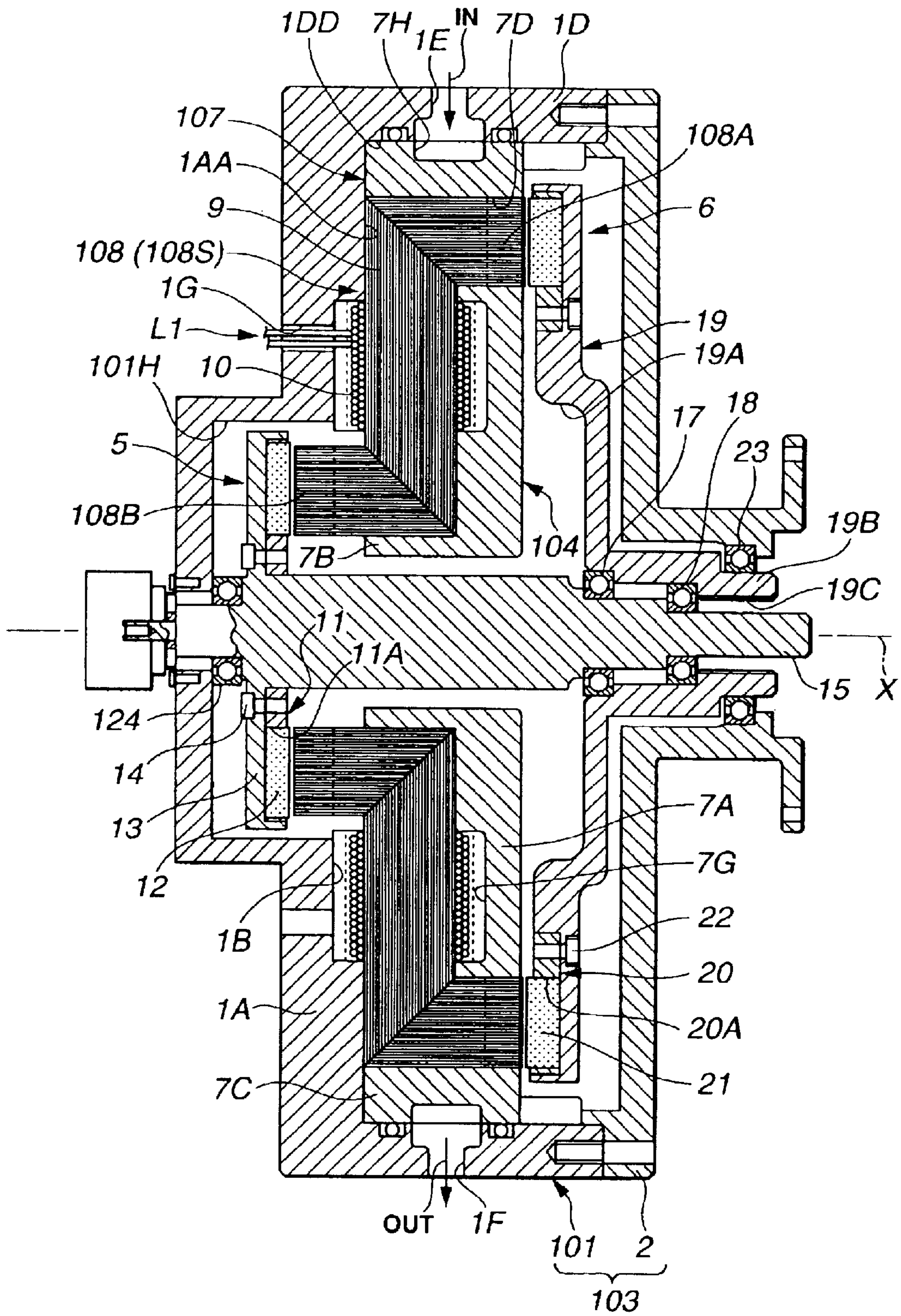
FIG. 5 is a vertical cross-section similar to FIG. 1, but showing a second embodiment of the electric rotating machine according to the present invention.

Referring now to FIG. 5, there is shown a second embodiment of the electric rotating machine which differs in arrangement of the two rotors and in construction of the stator and the casing from the first embodiment. Like reference numerals denote like parts, and therefore, detailed explanations therefor are omitted. As illustrated in FIG. 5, stator 104 differs in structure of stator bracket 107 and stator body 108 from stator 4 of the first embodiment. Stator element 108S of stator body 108 is similar to stator element 8S of stator body 8 of the first embodiment except for bending end portions 108A and 108B extending in opposite directions along axis X. Stator bracket 107 is similar to stator bracket 7 of the first embodiment except that base wall 7A has merely outer opening 7D in which outer bending end portion 108A of stator element 108S is disposed. Upon assembling stator 104, stator element 108S with winding 10 is fitted into stator bracket 107 in such a manner as to insert bending end portion 108A into outer opening 7D from the left side in FIG. 5.

Stator 104 is disposed within casing 103 in fitting relation to casing body 101. An outer surface of outer circumferential wall 7C of stator bracket 107 is in contact with inner surface 1DD of circumferential wall 1D of casing body 101. Axial end surfaces of inner and outer circumferential walls 7B and 7C of stator bracket 107 are in contact with wall surface 1AA of end wall 1A of casing body 101. Stator element 108S is interposed between end wall 1A of casing body 1 and stator bracket 107 and supported thereby in the axial direction.

Rotors 5 and 6 are disposed on the axially opposite sides of stator 104. Rotor 5 is formed on an end portion, on the left side as viewed in FIG. 5, of output shaft 15. An outer diameter of rotor body 13 is set such that magnet 12 is opposed to an axial end face of inner bending end portion 108B of stator element 108S. Rotor 6 has substantially the same structure as described in the first embodiment, in which magnet 21 is opposed to an axial end face of outer bending end portion 108A of stator element 108S.

End wall 1A of casing body 101 has rotor chamber 101H within which rotor 5 is disposed. Rotor chamber 101H is defined by a recessed portion of end wall 1A which is recessed from wall surface 1AA toward the outside, namely, to the left side in FIG. 5 in the direction of axis X. Output shaft 15 with rotor 5 is rotatably supported on casing body 101 by means of bearings 124, 17 and 18. Bearing 124 is mounted to a small diameter portion of output shaft 15 which is disposed axially adjacent to rotor body 13 of rotor 5. Bearing 124 is interposed between the small diameter portion of output shaft 15 and a bottom surface of rotor chamber 101H.

The second embodiment of the electric rotating machine is operated in the same manner as described in the first embodiment. The second embodiment of the electric rotating machine can enhance freedom in layout of rotors 5 and 6 in the axial direction and can perform the same effects as explained in the first embodiment.

This application is based on prior Japanese Patent Application No. 2002-033738 filed on Feb. 12, 2002, the entire contents of which are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An electric rotating machine, comprising:

a casing;

two disk-shaped rotors arranged to rotate independently of each other in concentric relation to each other within the casing, the rotors including magnets, respectively, the magnet of one of the rotors and the magnet of the other of the rotors being disposed radially offset from each other; and a stator disposed concentrically with the rotors within the casing, the stator comprising a radially outer portion axially opposed to the magnet of one of the rotors and a radially inner portion axially opposed to the magnet of the other of the rotors.

2. The electric rotating machine as claimed in claim 1, wherein the casing comprises an end wall supporting the stator thereon, the end wall being formed with a first groove, the stator comprising a winding disposed in the first groove.

3. The electric rotating machine as claimed in claim 2, wherein the stator comprises a stator bracket and a stator body mounted to the stator bracket, the winding being wound on the stator body.

4. The electric rotating machine as claimed in claim 3, wherein the stator body comprises a plurality of stator elements arranged in circumferentially spaced relation.

5. An electric rotating machine comprising:

a casing;

two disk-shaped rotors arranged in concentric relation to each other within the casing, the rotors including magnets, respectively, the magnet of one of the rotors and the magnet of the other of the rotors being disposed radially offset from each other, and a stator disposed concentrically with the rotors within the casing, the stator comprising a radially outer portion axially opposed to the magnet of one of the rotors and a radially inner portion axially opposed to the magnet of the other of the rotors, the casing comprising an end wall supporting the stator thereon, the end wall being formed with a first groove, the stator comprising a winding disposed in the first groove, the stator comprising a stator bracket and a stator body mounted to the stator bracket, the winding being wound on the stator body, the stator body comprising a plurality of stator elements arranged in circumferentially spaced relation, wherein each of the stator elements is in the form of laminated plates, each of the laminated plates comprising bending end portions and a core portion between the bending end portions, the core portion carrying winding wound thereon.

6. The electric rotating machine as claimed in claim 5, wherein the bending end portions extend in one direction.

7. The electric rotating machine as claimed in claim 5, wherein the bending end portions extend in opposite directions.

8. The electric rotating machine as claimed in claim 5, wherein the bending end portions have a width extending perpendicular to a longitudinal direction thereof, the width of the bending end portions gradually increasing radially outwardly.

9. The electric rotating machine as claimed in claim 5, wherein one of the bending end portions is disposed at the radially outer portion of the stator, the other of the bending end portions being disposed at the radially inner portion of the stator, the bending end portions forming magnetic pole portions upon the stator body being energized via the winding.

10. The electric rotating machine as claimed in claim 9, wherein the stator bracket comprises a disk-shaped base wall formed with first openings and second openings, the first openings and the second openings being disposed on a radial outer periphery of the base wall and a radial inner periphery thereof, respectively, the first openings and the second openings being arranged in circumferentially spaced relation, one of the bending end portions being fitted to the first openings, the other of the bending end portions being fitted to the second openings.

11. The electric rotating machine as claimed in claim 10, wherein the base wall of the stator bracket comprises a second groove in which the winding is disposed.

12. The electric rotating machine as claimed in claim 3, wherein the plurality of stator elements are interposed between the stator bracket and the end wall of the casing and supported thereby in the axial direction of the stator bracket, the stator bracket being fitted to the casing.

13. The electric rotating machine as claimed in claim 12, wherein the end wall of the casing comprises a fitting projection extending therefrom along the axial direction of the stator bracket, the stator bracket comprising an inner circumferential wall fitted onto the fitting projection.

14. The electric rotating machine as claimed in claim 3, wherein the casing comprises a circumferential wall, the stator bracket comprising an outer circumferential wall contacted with the circumferential wall of the casing, the outer circumferential wall being formed with a coolant passage adapted to pass a coolant therethrough.

15. The electric rotating machine as claimed in claim 14, wherein the circumferential wall of the casing is formed with an inlet and an outlet which are communicated with the coolant passage of the stator bracket.

16. The electric rotating machine as claimed in claim 1, wherein the one of the rotors is formed with a recessed portion within which the other of the rotors is disposed.

17. The electric rotating machine as claimed in claim 6, wherein the rotors are disposed on an axially one side of the stator.

18. The electric rotating machine as claimed in claim 7, wherein the rotors are disposed on axially opposite sides of the stator.

19. The electric rotating machine as claimed in claim 6, wherein the one of the rotors is formed with a recessed portion within which the other of the rotors is disposed.

20. The electric rotating machine as claimed in claim 1, wherein the stator is adapted to be supplied with compound current.

* * * * *